United States Patent [19]

Su

[11] 4,242,944
[45] Jan. 6, 1981

[54] PLASTICS MOULDING MACHINE

[76] Inventor: Jui-Lieh Su, 37 Lane 355, Fu-Chian Rd., Tainan, Taiwan

[21] Appl. No.: 955,398

[22] Filed: Oct. 27, 1978

[51] Int. Cl.³ ............................................. F01B 21/00
[52] U.S. Cl. ........................................ 92/2; 425/207; 425/542
[58] Field of Search .................... 308/237 R; 425/207, 425/208, 542, 574, 583; 92/2

[56] References Cited
U.S. PATENT DOCUMENTS

| 3,335,457 | 8/1967 | Martin | 425/208 X |
| 3,806,294 | 4/1974 | Hehl | 425/574 |

Primary Examiner—Thomas P. Pavelko

[57] ABSTRACT

An improved plastics moulding machine comprises an oil cylinder, an injection ram in said oil cylinder adapted to move forward and backward by the actuation of the hydraulic system, and a shafting consisting of a main driving shaft, a transmission shaft and a screw rod; wherein a fixed protection sleeve is provided between the main driving shaft and the injection ram for preventing the friction therebetween.

2 Claims, 4 Drawing Figures

PLASTICS MOULDING MACHINE

BACKGROUND OF THE INVENTION

The present invention relates to a plastics moulding machine particularly to a protection sleeve adopted between the main driving shaft and the injection ram of the moulding machine.

Several different types of plastics moulding machine have been known in the art, such as compression moulding machines, transfer moulding machines, injection moulding machines, and extruders etc. In earlier stages, the driving and injection mechanism in a moulding machine are connected through gear means and operate in different directions, resulting in a noisy and inefficient operation.

Recently, an improved plastics moulding machine is developed by a Japanese corporation and is shown in FIG. 1. The injection ram of the machine is moved forward and backward without rotation motion. However there are still disadvantages existed such as friction between main driving shaft and the injection ram, the oil ring is easily damaged, and low efficiency in operation.

In FIG. 2, there is shown another type of plastics moulding machines developed by the Nissei Plastics Industrial Co. Ltd. in Japan. The improved machine comprises an injection ram 4 which is driven by the hydraulic system 6 to move forward and backward. The main driving shaft 2 is driven by the motor 1 and connected to the transmission shaft 3, which passes through the injection ram 4 and connected to the screw rod 5. Because the motion of the injection ram is actuated by the hydraulic system, an oil ring is necessary between the main driving shaft 2 and the injection ram 4 to prevent the oil leakage. To the experience of the applicant, there has no such kind of plastics moulding machines which can prevent the oil leakage disadvantages.

SUMMARY OF THE INVENTION

The object of the present invention is to provide a plastics moulding machine which comprises a protection sleeve adopted between the main driving shaft and the injection ram to prevent the friction therebetween.

Other objects and advantages of the present invention will become apparent from the following detailed description with reference to the accompanying drawings.

DETAILED DESCRIPTION OF THE PREFERRED EMBODIMENT

Figure 2:
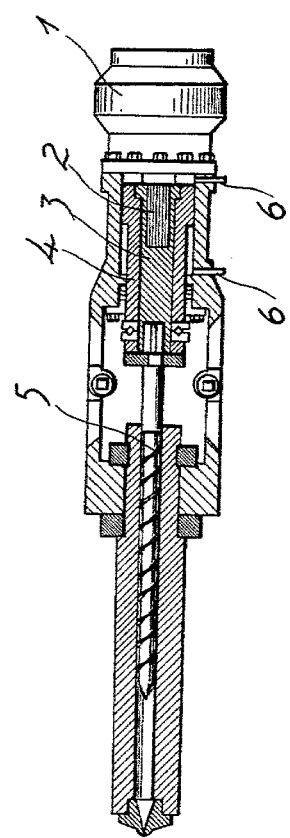
FIG. 2 is a sectional view of another conventional plastics moulding machine.
Figure 1:
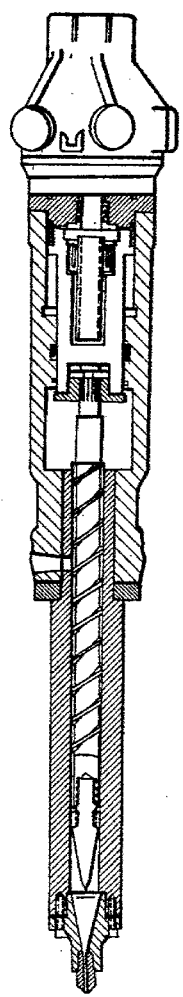
FIG. 1 is a sectional view of a conventional plastics moulding machine.
Figure 3:
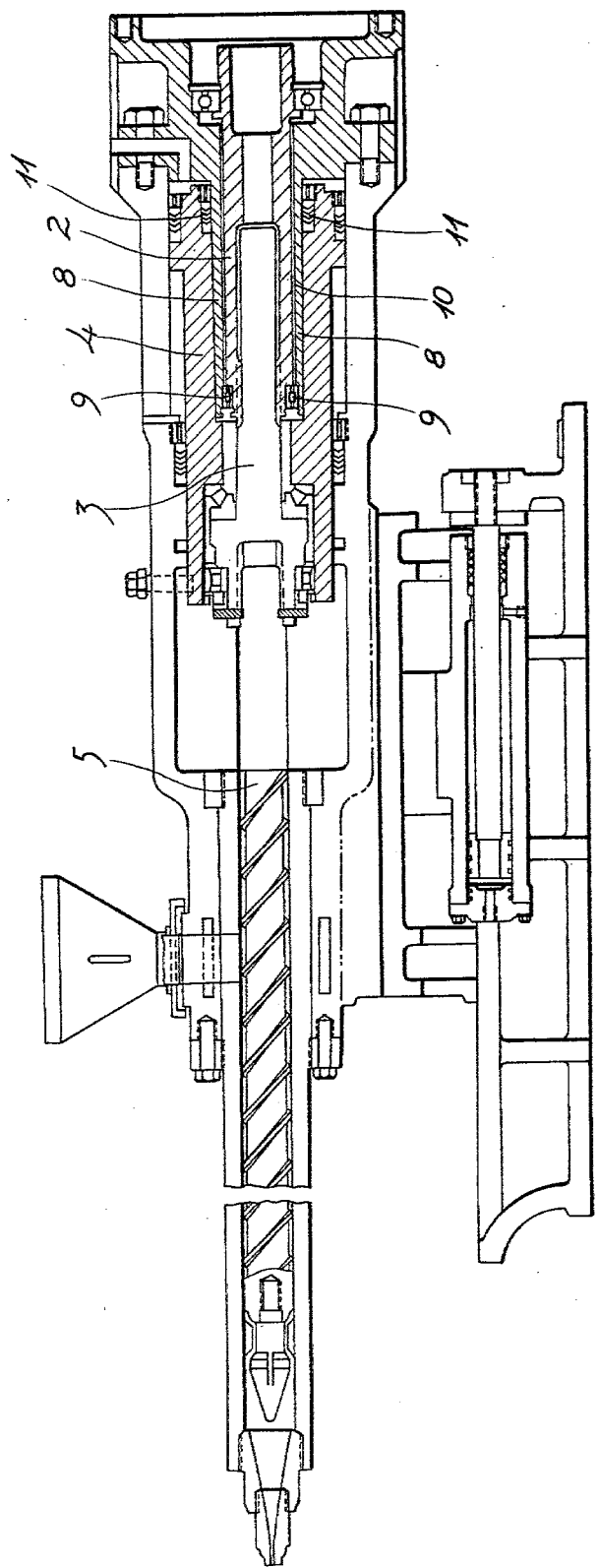
FIG. 3 is a sectional view of an improved plastics moulding machine according to the present invention, showing the positions of the movable parts in the moulding machine when feeding process is just finished.
Figure 4:
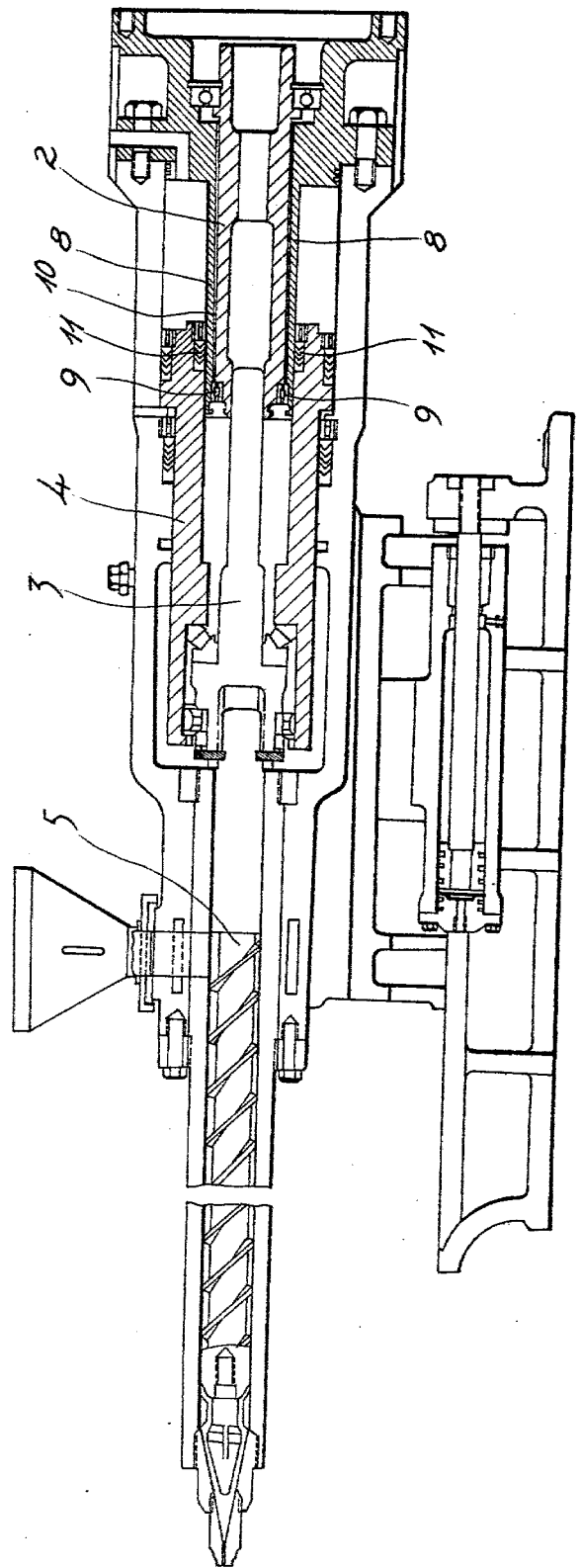
FIG. 4 is a sectional view of an improved plastics moulding machine according to the present invention, showing the positions of the movable parts in the moulding machine when injection process is just finished.

Referring to FIGS. 3 and 4, the main driving shaft 2 passes through the injection ram 4 and connected to the transmission shaft 3 and the screw rod 5. The structure of the present invention is mostly similar to the machine shown in FIG. 2. However it is not difficult to find out that a fixed protection sleeve 8 is provided between the main driving shaft 2 and the injection ram 4. The protection sleeve 8 is formed integral with the casing of the oil cylinder to provide an annular hydraulic cylinder as shown in FIGS. 4 and 5. A bearing 9 is provided in the protection sleeve 8 to form a chamber 10 between the protection sleeve 8 and the main driving shaft 2 and also keep a balanced rotation of the main driving shaft 2. An oil ring 11 is provided between the protection sleeve 8 and the injection ram 4. Thus, during the rotation of the main driving shaft 2, the protection sleeve 8 does not rotate to prevent the friction between the main driving shaft 2 and the injection ram 4. When the injection ram 4 moves forward and backward, only the oil ring 11 of the protection sleeve 8 contacts the injection ram 4 so that all friction associated with the hydraulic seal is overcome by the hydraulic ram drive, and none is applied to the rotating shaft, thereby reducing friction on the shaft.

It is to be noted that the oil ring 11 can absolutely seal the chamber 10 between the protection sleeve 8 and the main driving shaft 2 to prevent the oil leakage. The oil ring 11 suffers minimum damages and the friction between the main driving shaft 2 and the injection ram 4 will be almost zero.

What is claimed is:

1. An improved plastics moulding machine of the type comprising a hydraulic oil operating cylinder, an injection ram operating within said cylinder, and a rotating shaft system operating coaxially through the ram, wherein the improvement comprises: a fixed annular sleeve disposed between the ram and the shaft system, said shaft system operating through said sleeve, and an hydraulic seal provided between said ram and said sleeve, whereby said shaft is isolated from the hydraulic oil.

2. An improved plastics moulding machine as claimed in claim 2, wherein a bearing is disposed on said sleeve, the bearing supporting the rotating shaft system so as to reduce friction between the shaft system and said sleeve.

* * * * *